United States Patent Office 2,763,683
Patented Sept. 18, 1956

2,763,683

PREPARATION OF SALICYLANILIDE

Floyd L. Beman and Edgar C. Britton, Midland, Mich., assignors to The Dow Chemical Company, Midland, Mich., a corporation of Delaware No Drawing. Application January 5, 1955,
Serial No. 480,074

7 Claims. (Cl. 260—559)

This invention relates to an improved process for the preparation of salicylanilide from salicylic acid and aniline. It particularly pertains to an improved, commercially practicable process for reacting salicylic acid and aniline in the presence of a phosphorus chloride condensing agent whereby improved yields of pure salicylanilide are readily obtained.

Salicylanilide is conventionally prepared by reacting salicylic acid and aniline in the presence of phosphorus trichloride as a condensing agent. Usually the phosphorus trichloride is added slowly to a mixture of salicylic acid and aniline, or to a pre-formed aniline-salicylic acid salt. The reaction is vigorously exothermic and the temperature of the reaction mixture usually rises rapidly as the phosphorus trichloride is added. Hydrogen chloride is evolved and, after the addition of phosphorus trichloride is complete, the reaction mixture is usually heated to an elevated temperature in order to complete the elimination of hydrogen chloride.

Commercially, such a process is attractive because of the availability and price of the starting materials. However, the conventional process is commercially disadvantageous, principally because of the difficulty of controlling the vigorously exothermic reaction, the difficulty of handling the hot, molten crude reaction product, and because of the unsatisfactory low yield of pure material usually obtainable from that process as heretofore practiced.

An object of this invention is to provide an improved process for the preparation of salicylanilide from salicylic acid and aniline.

A particular object is to provide such a process whereby greatly improved yields of pure salicylanilide can be obtained.

Another object is to provide such a process which is readily controlled, particularly on a large scale.

Further objects and advantages will be evident from the following description of the invention.

The objects of this invention are attained in an improved process, more specifically described hereinafter, which combines the features of carrying out the reaction in an inert diluent liquid, admixing the reactants at a controlled low temperature, and heating the reaction mixture to an elevated temperature to complete the reaction.

The reaction mixture is prepared by admixing salicylic acid, aniline and a phosphorus chloride in an inert diluent liquid as hereinafter specified. During the preparation of the reaction mixture, the reaction mixture is kept at a restrained temperature, advantageously below 40° C. and preferably below about 25° C., e. g. from about 0° to about 25° C. The reaction is completed by raising the temperature of the reaction mixture above 40° C., preferably to a temperature in the range of from about 75° to about 180° C., and maintaining the reaction mixture at such temperature until evolution of hydrogen chloride is substantially complete.

The net overall chemical reaction herein concerned can be represented by the equation:

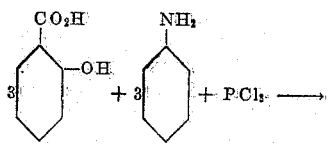
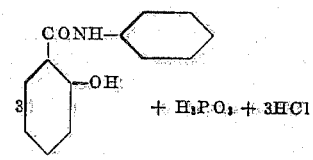

Usually the three principal reactants are charged in the approximate molar ratio as shown by the equation, although any of the reactants can be employed in smaller or larger proportions without affecting the process other than by reducing the chemical efficiency thereof. It is often desirable to employ a small excess, e. g. a 10 per cent excess over the theoretical amount, of the phosphorus chloride condensation agent. Excess or unreacted salicylic acid and/or aniline can be recovered from the reaction product mixture in usual ways.

In a preferred embodiment of the invention, the salicylic acid and aniline are dissolved or suspended in an inert diluent liquid, i. e. a liquid which is chemically inert to the same and the phosphorus chloride under the conditions of the present process. Suitable such diluent liquids are the hydrocarbon and chlorohydrocarbon liquids which are free of olefinic and/or acetylenic linkages, particularly such liquids boiling above about 75° C. under normal atmospheric pressure. Suitable hydrocarbons and chlorohydrocarbons include aliphatic hydrocarbons, such as petroleum ether, kerosene and naphtha, cycloaliphatic hydrocarbons, such as cyclohexane and decahydronaphthalene, chloroaliphatic compounds, such as carbon tetrachloride, aromatic hydrocarbons, such as benzene, toluene, the xylenes, ethylbenzene and the like; and chloroaromatic compounds, such as chlorobenzene, chlorotoluene and o-dichlorobenzene. Of these, the chlorohydrocarbons are usually preferred because of the reduced fire hazard as compared to the use of hydrocarbons. Mixtures of inert diluent liquids may be used, if desired. It is convenient to choose the inert diluent liquid so that the boiling point of the reaction mixture corresponds with the temperature at which it is desired to heat the reaction mixture for the elimination of hydrogen chloride, since such a choice affords an automatic control of temperature during that step. Furthermore, the yield of salicylanilide is improved by operating with active boiling of the inert diluent. Any inert diluent liquid may be employed, and the steps of the process can be carried out under atmospheric, subatmospheric or superatmospheric pressure. It is desirable to operate in such a manner that hydrogen chloride is removed from the reaction mixture as rapidly as possible.

The proportion of inert diluent liquid in the reaction mixture is not critical, but preferably is such that a fluid, easily stirred reaction mixture is provided throughout the process. Usually, from about one to about four parts by weight of diluent liquid is employed per part of total reactants. Usually, a portion of the diluent liquid is used to form a solution or a thin slurry or suspension of the salicylic acid and aniline, and another portion of the diluent liquid is added to the phosphorus chloride reactant to facilitate the controlled addition of the latter to the reaction mixture.

A preferred embodiment of the invention comprises the step of adding the phosphorus chloride, or an inert diluent solution thereof, to a mixture of salicylic acid, aniline and an inert diluent liquid, while restraining the temperature of the resulting reaction mixture, advantageously below about 40° C. and preferably between about 0° and about 25° C. The phosphorus chloride reactant is preferably phosphorus trichloride, or a mixture thereof with not more than an equal weight of phosphorus oxychloride, and is usually added slowly, with agitation of the reaction mixture, the rate of addition being determined principally by the rate at which heat can be removed from the reaction zone and the temperature of the reaction mixture maintained in the desired range.

It is important that the temperature of the reaction mixture during the preparation thereof be maintained at a low temperature as specified in order that maximum yields of pure salicylanilide be obtainable by this process. When the reaction temperature is not so restrained but is allowed to rise above about 40° C. during this step, even if good control of temperature is maintained, the yield of product obtainable is inferior to that obtainable by holding the temperature below 40° C.

A non-restrictive hypothesis is that, when the reactants are admixed at temperatures below 40° C. as specified, an intermediate reaction takes place with formation of aniline hydrochloride and a mixed anhydride of phosphorus and salicylic acids. During subsequent heating, these intermediates react readily to form salicylanilide and to liberate hydrogen chloride. In contrast, when the reactants are admixed at temperatures above about 50° C., an appreciable amount of a different compound is formed which is an ester of phosphorus acid involving the phenolic hydroxyl group of salicylic acid. This by-product either does not further react to form salicylanilide or does so reluctantly, or reacts preferentially to form undesired end-products and thereby reduces the yield of salicylanilide. However, the invention is not to be bound or restricted by this or any other theory.

Other modes of preparing the mixture of ingredients can be employed in place of the ones just described, provided the temperature of the admixture during preparation thereof is restrained as specified. The reactants can be added together in any order, preferably by addition to at least a portion of the inert diluent liquid, or concurrent addition of two or more of the reactants can be employed.

After the reactants are completely admixed at a low temperature as specified, the reaction is continued and completed by heating the reaction mixture to an elevated temperature, preferably in the range of from 75° C. to 180° C. At temperatures higher than 180° C. decomposition may occur to a considerable extent.

During the heating and elevated temperature treatment, hydrogen chloride is evolved from the reaction mixture. The time required to complete the elimination of hydrogen chloride is dependent upon the temperature of the treatment, being a shorter time at a higher temperature. To obtain best yields of salicylanilide, it is desirable to remove the hydrogen chloride from the reaction mixture as rapidly as it can be formed by the reaction. This can readily be accomplished by causing the liquid diluent to boil vigorously and conducting the hydrogen chloride out of the reaction zone. The reaction mixture can be boiled under reflux with the hydrogen chloride being vented from the reflux condenser. It is sometimes preferable to distill a portion of the inert liquid diluent out of the reactor in order to carry the hydrogen chloride away from the reaction mixture. In such instances, fresh diluent can be added to the reaction mixture during the operation to replace that which is removed as distillate, and the organic material in the distillate can be condensed, freed of hydrogen chloride (e. g., by washing with water and drying) and rendered suitable for reuse in the same or different process. Elimination of hydrogen chloride from the reaction mixture can also be accelerated by carrying out the boiling operation under reduced pressure. When the evolution of hydrogen chloride ceases, the reaction as represented by the hereinbefore recited equation may be considered substantially complete.

Any suitable procedure for recovery of salicylanilide from the reacted mixture may be used. A particularly advantageous procedure is to steam distill the reaction mixture, whereby the inert diluent liquid is removed and the residual mixture is converted to a slurry of solid or semi-solid organic matter in an aqueous medium. The inert diluent liquid can be separated from the distillate, dried and reused in a subsequent like batch. The resulting aqueous slurry of crude salicylanilide is much more conveniently handled in further operations, e. g. for the recovery of salicylanilide therefrom, than is the hot, molten or gummy solid reaction product usually obtained by previous methods.

The aqueous slurry, remaining after removal of the diluent liquid, can be treated with just sufficient alkali to neutralize any free strong acid and to liberate any unreacted aniline which can then be removed by continued steam distillation. The recovered aniline can also be separated, dried and reused.

The aqueous slurry, remaining after removal of the aniline, can be cooled and treated, if necessary, to adjust the pH to between about 6 and about 7. The resultant slurry can be filtered, whereby a solid cake is separated from an aqueous filtrate. The solid cake, washed with water and dried, is substantially pure salicylanilide.

The aqueous filtrate from the salicylanilide can be acidified, whereupon there precipitates any unreacted salicylic acid remaining in the reaction mixture. The precipitated salicylic acid can be separated, dried and reused.

The following examples illustrate the improved method of this invention, but are not to be construed as limiting its scope. For contrast, reference is made in the examples to previously known practices over which the present invention is an improvement.

*Example 1*

To about 250 mls. of chlorobenzene were added 0.3 gram-mole of salicylic acid and 0.3 gram-mole of aniline. The mixture was stirred and cooled to a temperature about 10° C. To the cooled mixture was added 0.1 gram-mole of phosphorus trichloride dissolved in about 50 mls. of chlorobenzene. During the addition of the phosphorus trichloride solution, stirring was continued and the temperature of the reaction mixture was maintained between 10° and about 25° C. About five minutes after the complete addition of the phosphorus trichloride solution, the reaction mixture was heated to the reflux temperature, initially about 120° C., at atmospheric pressure. Heating and boiling of the reaction mixture was continued for about 30 minutes during which time hydrogen chloride was evolved and the temperature of the boiling liquid gradually rose. After evolution of hydrogen chloride substantially ceased, the temperature of the reaction mixture was about 135° C.

Thereafter, the reaction mixture was cooled and was steam distilled substantially to remove the chlorobenzene solvent.

The aqueous slurry residue remaining after removal of the chlorobenzene was then neutralized with sodium hydroxide solution to a pH value of about 7 and was further steam distilled, thereby removing aniline. As determined by titrimetric assay of the steam distillate, there was recovered about 7 per cent of the charged aniline.

The resulting steam distilled residue slurry, having a pH value of about 6–7, was cooled to 25° C. and was filtered, and the cake was washed with water and dried. There was obtained 0.282 gram-mole of pure salicylanilide having a melting point of 137°–138° C. The yield of salicylanilide corresponded to about 94 per cent of the theoretical.

In place of the phosphorus trichloride in the foregoing reaction charge, there can be substituted mixtures of phosphorus trichloride and up to an equal weight thereof of phosphorus oxychloride, with substantially equivalent results.

For purposes of contrast with the above process, 0.3 gram-mole of salicylic acid and 0.3 gram-mole of aniline were reacted with 0.1 gram-mole of phosphorus trichloride in the absence of any inert diluent liquid. The reaction temperature rose spontaneously to, and was held at, 100°–130° C. during the phosphorus trichloride addition. There was obtained from the reaction product 55.4 per cent of theory of impure salicylanilide melting at 129°–132° C. When the experiment was repeated with a reaction temperature of 100°–150° C., there was obtained a 56.2 per cent of theory yield of impure salicylanilide. The yield and quality of salicylanilide in these experiments were distinctly inferior to those obtained by the improved process hereinbefore illustrated.

An experiment was conducted in which the preferred procedure was modified to omit the low-temperature condition of the mixing step. Instead, the reactants, in the proportions first shown above, were admixed at the reflux temperature of the chlorohydrocarbon diluent. Thereafter, the reaction product mixture was worked up as hereinbefore described, whereby a yield of salicylanilide corresponding to 76.2 per cent of theory was obtained. The melting point of the salicylanilide product was 136°–137° C. While the yield and quality of product were much better than those obtained without the use of diluent solvent, they were inferior to those obtained in the preferred procedure.

*Example 2*

By a procedure similar to that of Example 1, 0.1 gram-mole of phosphorus trichloride in carbon tetrachloride solution was added to a mixture of 0.3 gram-mole of salicylic acid and 0.3 gram-mole of aniline in carbon tetrachloride, the total quantity of carbon tetrachloride being 300 mls. The temperature of the reaction mixture during the addition of the phosphorus trichloride solution and for one-half hour thereafter was held between about 10° and about 25° C. The temperature of the reaction mixture was thereafter raised to about 80° C. at which the mixture refluxed and was held at such temperature for about eight hours. Thereafter, the reaction mixture was worked up as described in Example 1, whereby there was obtained salicylanilide having a melting point of 137°–138° C. in a yield corresponding to 84.8 per cent of theory.

*Example 3*

To a suspension of 0.3 gram-mole of salicylic acid in 300 mls. chlorobenzene was added 0.1 gram-mole of phosphorus trichloride while the temperature was held between 10° and 25° C. There was then added 0.3 gram-mole of aniline while the temperature was maintained between 10° and 25° C. About five minutes after the admixture was complete, the reaction mixture was heated to boiling under reflux, intitially at a temperature of about 120° C., at atmospheric pressure. Heating and boiling was continued for 40 minutes as hydrogen chloride was evolved and the temperature of the reaction mixture rose to about 135° C.

Thereafter, the reaction mixture was treated in a manner like that described in Example 1, whereby 7.8 per cent of the charged aniline was recovered and pure salicylanilide, melting at 137°–138° C., was obtained in amount corresponding to about 91 per cent of theory based on salicylic acid and aniline charged to the reaction.

*Example 4*

Into a 10-gallon, jacketed, enamel-lined reactor equipped with an agitator and a reflux condenser were charged 8.24 pounds (0.06 pound-mole) of salicylic acid, 62.5 pounds of chlorobenzene and 5.58 pounds (0.06 pound-mole) of aniline. The mixture was stirred until an easily stirred crystalline slurry resulted. Cooling water was passed through the jacket. To the cooled slurry was added a solution of 2.89 pounds (0.021 pound-mole, 105% of theory) of phosphorus trichloride in 3.5 pounds of chlorobenzene. The addition of the phosphorus trichloride solution was made in four approximately equal portions over a period of about 45 minutes. The temperature of the slurry at the start of the phosphorus trichloride solution addition was about 18° C., rose to a maximum of about 25° C. and fell to about 21° C. at the last addition. After about 30 minutes of continued agitation after the admixture was complete, steam was admitted to the jacket of the reactor and the reaction mixture was rapidly heated. The temperature rose to about 110° C. in about 34 minutes, whereupon evolution of hydrogen chloride began. After about 40 minutes of rapid evolution of HCl, the temperature of the reaction mixture was 125° C., the reaction mixture was a clear solution and evolution of HCl diminished. Reflux was continued for 1.25 hours, after which the temperature of the reaction mixture was 137° C. and no more HCl was evolving. The reaction mixture was cooled over a period of about one hour to a temperature of about 100° C. The reactor was fitted with a sparger and open steam was blown through the reaction mixture for three hours to cause steam distillation of the chlorobenzene solvent. From the condensed steam-distillate there was recovered 62.3 pounds of chlorobenzene.

The residue from the steam distillation of chlorobenzene was a slurry of a crystalline solid in an acidic aqueous medium. The pH value of the aqueous medium was adjusted to about 8 by addition thereto of 1180 mls. of 50 per cent by weight sodium hydroxide aqueous solution and steam distillation was resumed. There was thereby obtained 13.95 liters of distillate containing (by titrimetric assay) 0.00625 pound-mole of aniline, corresponding to 10.4 per cent of the aniline charged.

The residue from the aniline steam distillation was cooled to 30° C. and removed from the reactor. The pH value of the slurry was adjusted to between 6.5 and 7 by addition thereto of a trace of concentrated hydrochloric acid, and the slurry was centrifuged to obtain a solid crystalline cake and a filtrate. The crystalline cake was washed with cold water and dried. There was thereby obtained 10.53 pounds (0.0495 pound-mole) of salicylanilide, corresponding to 82.5 per cent of theory based on the amount of salicylic acid and aniline charged to the reaction. The salicylanilide melted at 136.0° to 136.5° C. and its titrimetric assay was 100 per cent.

The filtrate from the salicylanilide was made strongly acid (to a pH value of 1) by addition of concentrated hydrochloric acid, whereupon salicylic acid precipitated and was collected on a filter, was washed and dried. There was obtained 0.605 pound (0.00438 pound-mole) of salicylic acid corresponding to 7.3 per cent of the amount charged.

The procedural steps and mode of operation of the present process have been employed for the making of other acylanilides, e. g., by reaction of salicylic acid with o- and m-toluidine, N-methylaniline, 2,5-xylidine and p-chloroaniline, and by reaction of aniline with o-cresolic acid, gentisic acid, 5-bromosalicylic acid and 5-chlorosalicylic acid, but without obtaining the outstanding improvements over already known methods which are obtained in the preparation of salicylanilide.

We claim:

1. In a method for the preparation of salicylanilide wherein a reaction mixture comprising salicylic acid, aniline and phosphorus trichloride is heated to a temperature between about 75° and about 180° C. until the reaction is substantially complete, the improvement which comprises forming the mixture of salicylic acid, aniline and phosphorus trichloride in the presence of an inert diluent liquid at a temperature below about 25° C.

2. A method for the preparation of salicylanilide which comprises the steps of adding approximately one molecular proportion of phosphorus trichloride to a mixture of approximately three molecular proportions of salicylic acid and approximately three molecular proportions of aniline in the presence of an inert diluent liquid, at a temperature below about 25° C., thereafter raising the temperature of the reaction mixture and boiling the reaction mixture at temperatures between about 75° C. and about 180° C. until the elimination of hydrogen chloride from the reaction mixture is substantially complete, and separating salicylanilide from the reaction mixture.

3. A method according to claim 2 wherein the inert diluent liquid is chlorobenzene.

4. A method according to claim 2 wherein the operations are carried out at substantially atmospheric pressure.

5. A method according to claim 2 wherein the operations are carried out at pressures below atmospheric pressure.

6. A method according to claim 2 wherein the operations are carried out under reflux.

7. A method according to claim 2 wherein the operations are carried out with distillation of the inert diluent liquid during the elimination of the hydrogen chloride.

References Cited in the file of this patent

UNITED STATES PATENTS

| | | |
|---|---|---|
| 1,140,747 | Kahn et al. | May 25, 1915 |
| 1,938,902 | Grether et al. | Dec. 12, 1933 |
| 1,955,809 | Goldstein et al. | Apr. 24, 1934 |
| 2,410,397 | Weiss et al. | Oct. 29, 1946 |